UNITED STATES PATENT OFFICE.

MARIUS VIAN, OF MARSEILLES, FRANCE.

IMPROVED COMPOSITION FOR PROTECTING SHIPS' BOTTOMS.

Specification forming part of Letters Patent No. 45,006, dated November 8, 1864.

*To all whom it may concern:*

Be it known that I, MARIUS VIAN, of Marseilles, in the Empire of France, have invented certain new and useful Improvements in Protecting the Bottoms of Iron-Plated Ships against Oxidation and Incrustation; and I hereby declare that the following is a full, clear, and exact description of the same.

My invention has for its object the protection of the bottoms of iron or iron-plated ships against oxidation, or vegetable or animal incrustations, or incrustations from other adhering substances; and it consists in a new composition which I denominate "ferromanganic mixture," used and applied in the manner as follows:

I first apply, by means of a brush, upon the iron surface of the ship's bottom two coats of paint, composed of seven hectokilograms of yellow beeswax, six kilograms of spirits of essence of turpentine, one kilogram seven hectokilograms of manganized oil, making a total of eight kilograms four hectokilograms of compound oil. With this oil I make a paint by taking one kilogram of the compound oil, one kilogram of white zinc, making two kilograms of liquid paint of a white color, slightly tinged with yellow.

I would here state that it is important that the wax should be melted in the first place, and that the mixture of manganized oil and essence of turpentine is then added by properly stirring the whole mass. The proportions given are those that I have found to be the best to obtain good results.

The paint being properly applied onto the iron sides and bottom, I spread over it, by means of a trowel, a cement or coating composed as follows: one kilogram of compound oil, one kilogram five hectokilograms of white zinc, making a total of two kilograms five hectokilograms of mastic, to which is added fifteen per centum of bioxide of mercury and fifteen per centum of arsenious acid; or twenty per centum of bioxide of mercury may be added to the two kilograms five hectokilograms of mastic. To this compound may be given any desirable color by adding a small quantity of coloring-matter. I prefer adding a small quantity of black, which will give to the mastic a grayish tint, in order that the second coating may be distinguished from the first coating, and so that the painters or workmen may not miss covering the whole surface, which they may otherwise do if there were not a difference in the colors or shades.

Having thus described my invention and the manner in which the same is or may be performed, I claim as new—

The herein described compound called "ferromanganic mixture," to be applied to the bottom of iron or iron-plated ships or vessels in the manner and for the purpose of protecting the parts thus coated against oxidation and incrustation, substantially as set forth.

In testimony whereof I have signed my name to this specification before two subscribing witnesses.

MARIUS VIAN.

Witnesses:
W. COURET,
N. BERLAR.